Aug. 9, 1938.　　　　W. STANLEY　　　　2,126,227
FISHING REEL AND WINDING GEAR GENERALLY
Filed Feb. 27, 1936

Inventor
Walter Stanley
by Mawhinney & Mawhinney
Attorneys.

Patented Aug. 9, 1938

2,126,227

UNITED STATES PATENT OFFICE 2,126,227

FISHING REEL AND WINDING GEAR GENERALLY

Walter Stanley, Kidderminster, England

Application February 27, 1936, Serial No. 66,102
In Great Britain March 7, 1935

7 Claims. (Cl. 242—84.5)

This invention relates to fishing reels where the winding means has a frictional engagement, which can be adjusted, with the spool.

My main object is to provide a very simple construction of this kind. A further and particular object is to arrange for the winding means to frictionally engage a radial face of the spool near its outer edge. A further object is to arrange for the frictional engagement to be adjusted by means remote from the reel spindle.

These and other objects will be easily comprehended from a consideration of the following description, in which reference is made to the accompanying drawing showing different embodiments of my invention.

In the drawing—

Like numerals indicate like parts throughout the drawing.

Figure 1:
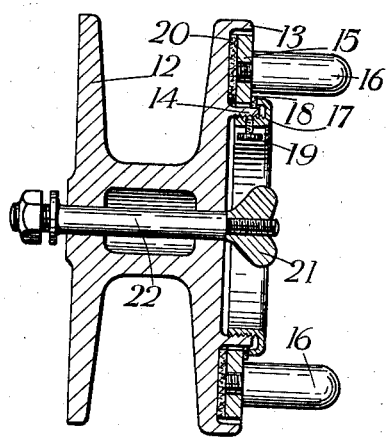
Figure 1 is a longitudinal section through a Nottingham reel adapted according to the invention.

In the arrangement of Figure 1, the spool 12 is rotatably mounted upon the spindle 22 being removably secured thereon by the wing-nut 21, one radial face of the spool 12 is provided with an overhanging rim 13 and within this is a circular flange 14 so that there lies between the rim and the flange a shallow groove the bottom of which is smooth. In the groove lies a ring 15 to which is secured at least one winding handle 16. One of these members (the rim or the flange) carries an adjustable bead which prevents the ring from coming out of position and can also be caused to exert the required amount of pressure on the ring to ensure the frictional engagement thereof with the spool. For example, the annular bead 17 may be of U-section screwing on to the interior of the flange and engaging the ring through a friction washer 18. A locking device such as a grub screw 19 serves to hold the adjustable bead in the required position. Interposed between the contact face of the spool and the ring, and secured to one of them, is a suitable friction material 20, such as cork. This is preferably in the form of a complete facing rather than of separate discs.

Figure 2:
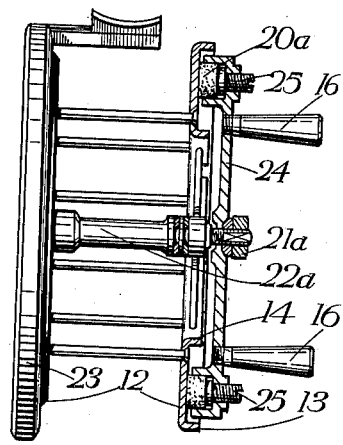
Figure 2 is a part-sectional elevation showing a reel adapted according to the invention in an alternative manner.

In Figure 2 the spool 12 is fast on the spindle 22a journalled in the end plate 23, and the handles 16 are carried by a bridging piece 24, the latter carrying friction washers 20a engaged with the adjacent surface of the spool. The bridging piece is rotatively mounted on the reduced spindle end, and adjustment is effected by means of the screws 25 behind the friction washers 20a.

Figure 3:
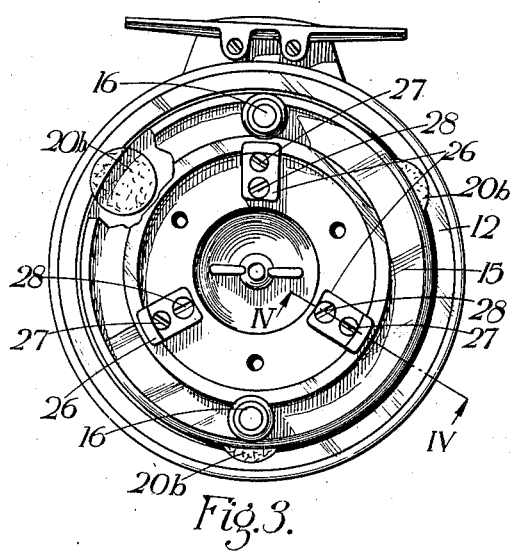
Figure 3 is an end elevation of another form of reel adapted according to the invention, Figure 4 being a section, to a larger scale, taken on the line IV—IV of Figure 3.
Figure 4:
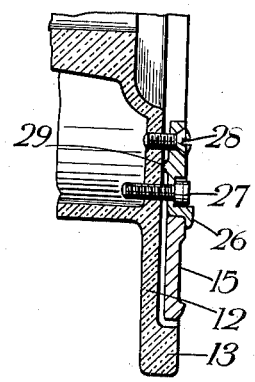

In Figures 3 and 4 a slip ring 15 carrying the handles 16 is fitted into a groove at the side of the spool 12, and the axial pressure is provided by three clamping pieces 26 secured to the spool and engaging the ring. These pieces can be rocked, as the screws 27, 28 are appropriately adjusted, on the ridges 29. The spool face in this instance has three inserts 20b, preferably of cork, let into it to be engaged by the ring 15.

By this means the handles 16 are frictionally connected with the spool and can operate the reel as long as the tension on the line is below a certain value, adjustment being provided by moving an adjusting member which is remote from the reel spindle.

What I claim as my invention and desire to secure by Letters Patent of the United States, is:

1. A fishing reel comprising a spool, means rotatively supporting the spool, the spool having a face near its outer edge, said face being perpendicular to the spool axis, winding means for the spool frictionally engaging said face, and means mounted on the spool for adjusting the pressure of said winding means on said face, said adjusting means being in the form of an annulus having screw-threaded engagement with the spool.

2. A fishing reel comprising a spool, means rotatively supporting the spool, an annular winding means for the spool frictionally engaging a radial face of the spool, and a clamping piece for adjustably holding the winding means, said clamping piece being secured to the spool by screws and having between the screws a ridge engaging the spool and having a lip engaging the winding means.

3. A fishing reel comprising a spool, means rotatively supporting the spool, said means including a spindle, winding means for the spool in the form of a bridging piece rotatively mounted on the spindle, the bridging piece carrying adjustable pads frictionally engaging a radial face of the spool remote from the axis of the spindle.

4. A fishing reel comprising a spool, means rotatively supporting the spool, the spool having a radial face near its outer edge, winding means rotatively supported on the spool near the axis thereof, and a plurality of frictional elements carried by said winding means for frictionally engaging said radial face, said frictional elements being axially adjustable to vary said frictional engagement.

5. A fishing reel comprising a spool, means rotatively supporting the spool, the spool having a recessed face, an annular winding means mounted in said recess, angularly-spaced frictional elements located in said recess and angularly-spaced means for retaining said winding means in contact with said frictional elements, said retaining means being individually adjustable to vary the engagement between said winding means and said frictional elements.

6. A fishing reel comprising a spindle, a spool having an end plate and removably mounted on said spindle, winding means engaging said end plate only at a position spaced from said spindle, and adjustable pressure means between said plate and said winding means at a position also spaced wholly from said spindle to bind the winding means and plate together with a substantially constant force and being removed from the spindle to leave the same unobstructed for the removal of the said spool therefrom.

7. A fishing reel comprising a spool having an end plate, winding means engaging said plate at a position spaced from the center thereof, and pressure means including screw-threaded members radially spaced from the center of said plate and exerting substantially constant adjustable pressure between said winding means and said plate.

WALTER STANLEY.